(12) United States Patent
Iwakura

(10) Patent No.: US 7,058,094 B2
(45) Date of Patent: Jun. 6, 2006

(54) Q-SWITCH LASER DEVICE

(75) Inventor: Mitsuo Iwakura, Tokyo (JP)

(73) Assignee: Orc Manufacturing Co., Ltd., Tokyo (JP)

( * ) Notice: Subject to any disclaimer, the term of this patent is extended or adjusted under 35 U.S.C. 154(b) by 198 days.

(21) Appl. No.: 10/883,796

(22) Filed: Jul. 6, 2004

(65) Prior Publication Data

US 2005/0018718 A1 Jan. 27, 2005

(30) Foreign Application Priority Data

Jul. 22, 2003 (JP) .............................. 2003-277544

(51) Int. Cl.
*H01S 3/11* (2006.01)
(52) U.S. Cl. .......................................... 372/10; 372/25
(58) Field of Classification Search .................. 372/10, 372/25
See application file for complete search history.

(56) References Cited

U.S. PATENT DOCUMENTS

| | | | | |
|---|---|---|---|---|
| 4,675,872 A | * | 6/1987 | Popek et al. ................... | 372/10 |
| 6,009,110 A | * | 12/1999 | Wiechmann et al. ......... | 372/10 |
| 6,188,704 B1 | * | 2/2001 | Kwon et al. ................... | 372/25 |

| | | | | |
|---|---|---|---|---|
| 2005/0018723 A1 | * | 1/2005 | Morita et al. ............ | 372/29.02 |

FOREIGN PATENT DOCUMENTS

| | | |
|---|---|---|
| JP | A 2000-101176 | 4/2000 |
| JP | A 2001-007429 | 1/2001 |
| JP | A 2002-359422 | 12/2002 |

* cited by examiner

*Primary Examiner*—Min Sun Harvey
*Assistant Examiner*—Delma R. Flores-Ruiz
(74) *Attorney, Agent, or Firm*—Berenato, White & Stavish LLC

(57) ABSTRACT

A Q-switch laser device for outputting a pulse laser from an optical resonator is equipped with a Q-switch for changing high/low values of a Q-value for the resonator; a switch-pulse generation means for generating a switch pulse with a frequency for determining a repetition period of the pulse laser; an RF oscillation means for generating an RF signal with a frequency higher than that of the switch pulse; a pulse synchronization means for inputting the switch pulse and RF signal and outputting a phase-synchronization pulse, where arising timing of the former is synchronized with a phase of the latter; and an RF modulation means for inputting the phase-synchronization pulse and outputting the RF signal as an RF modulation signal of the RF signal made ON/OFF, corresponding to a period of L/H-levels of an input pulse, wherein the Q-switch changes the Q-value of the resonator to the high/low values.

24 Claims, 10 Drawing Sheets

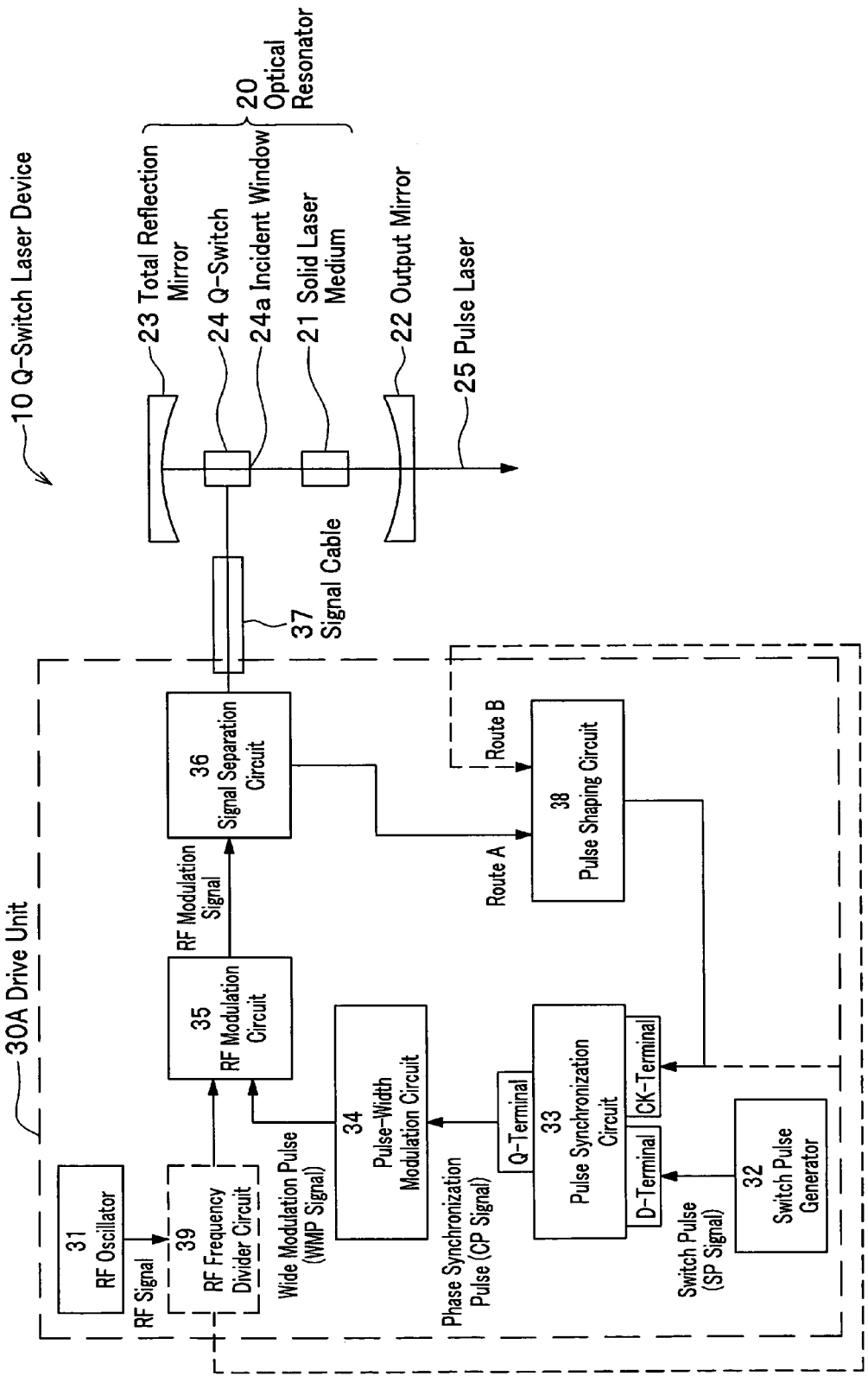

ON/OFF time : 50 nsec/div.
Change Point A1

ON/OFF time : 50 nsec/div.
Change Point B2

ON/OFF time : 50 nsec/div.
Change Point A2

ON/OFF time : 50 nsec/div.
Change Point B2

ON/OFF time : 50 nsec/div.
Change Point A3

ON/OFF time : 50 nsec/div.
Change Point B3 time(sec)

time(sec)

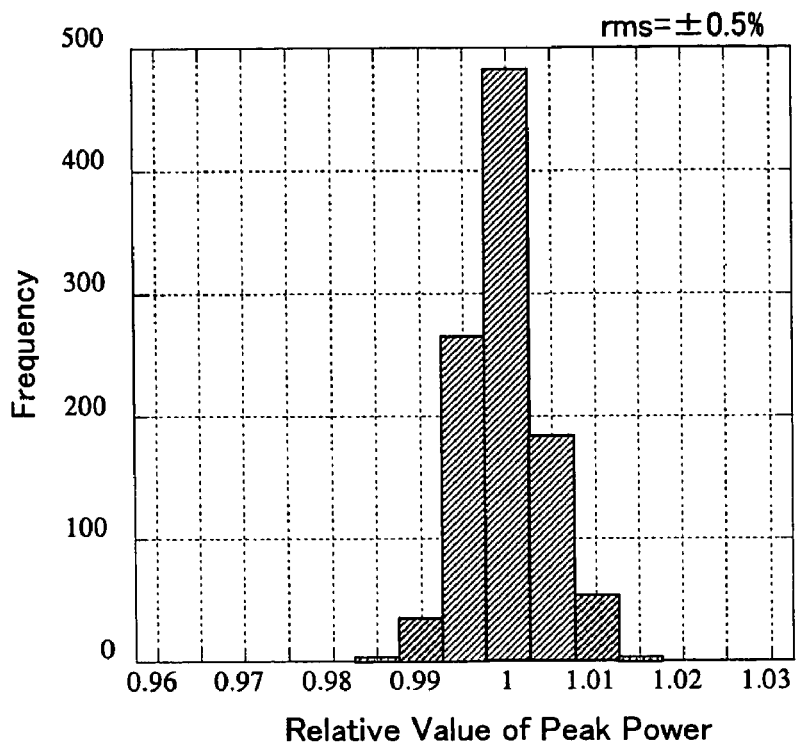
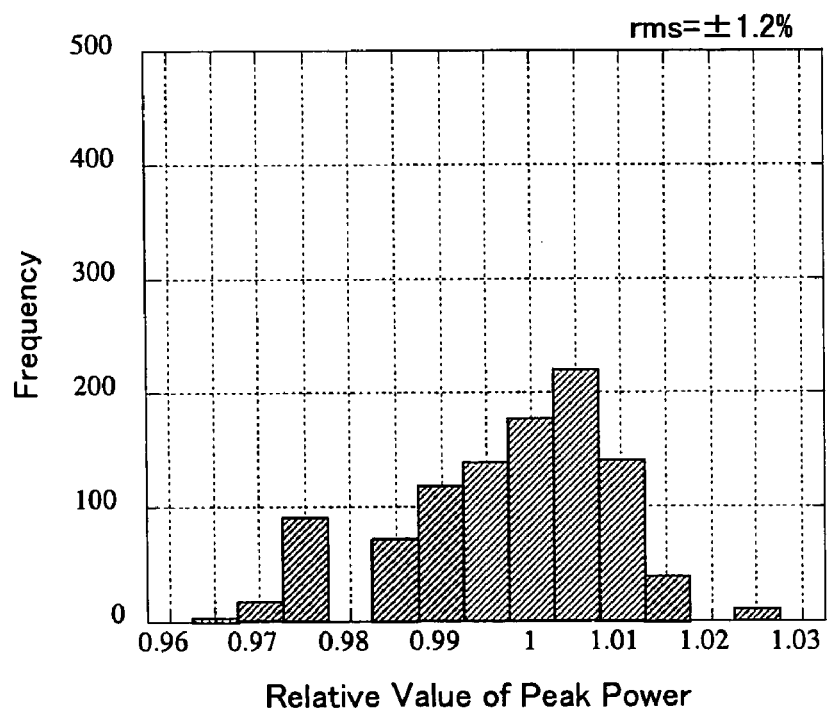

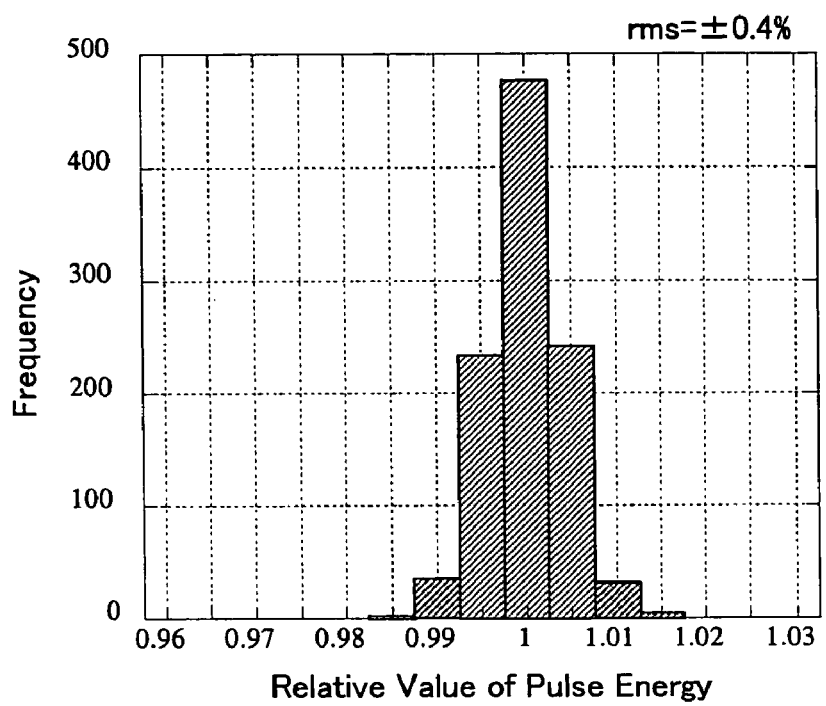
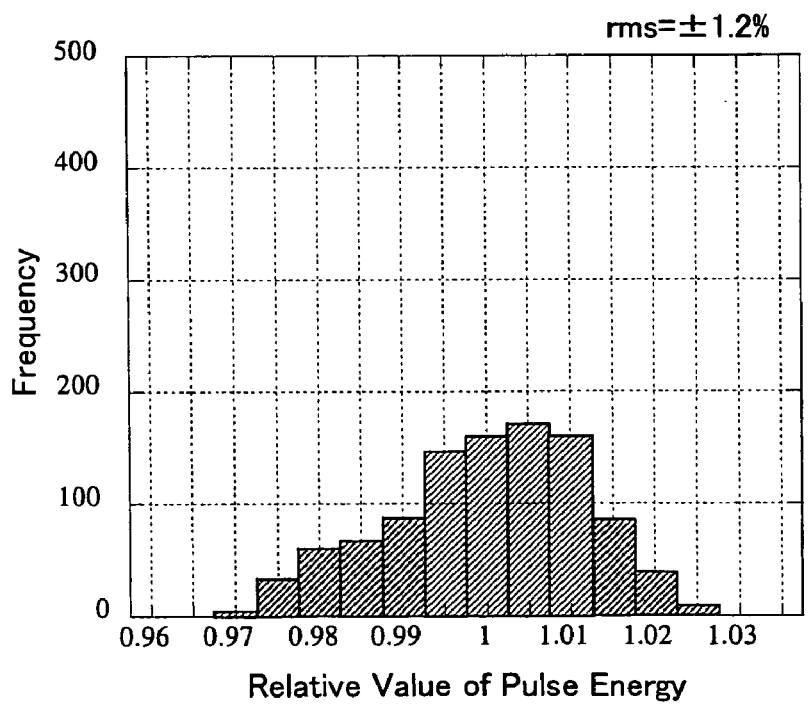

Q-SWITCH LASER DEVICE

BACKGROUND OF THE INVENTION

1. Field of the Invention

The present invention relates to a Q-switch laser device, and in particular, the Q-switch laser device for generating a laser wave of a peak shape by applying an RF (Radio Frequency) signal to a Q-switch and modulating the RF signal.

2. Description of the Related Art

Conventionally, a Q-switch laser device is widely utilized in a precision processing such as cutting, punching, and marking of a material by instantaneously taking out energy (unit J, joule) accumulated inside an optical resonator as a laser light, which has extremely high peak power (unit W, watt), with using an optical means called a Q-switch.

Referring FIGS. 9 and 10, a configuration and principle of a drive unit in a conventional Q-switch laser device will be described. FIG. 9 is a block diagram showing a basic configuration of the drive unit for driving a Q-switch in the conventional Q-switch laser device. FIG. 10 is an illustration drawing representing signals which components configuring the drive unit handle.

A drive unit 30C consists of an RF oscillator 31', a switch pulse generator 32', and an RF modulation circuit 35'.

The RF oscillator 31' oscillates, for example, an RF signal of 40 MHz as shown in FIG. 10. The RF signal is a signal for operating a Q-switch not shown so that a Q-value becomes a low value when the RF signal is input to an optical resonator 20'. The switch pulse generator 32' generates a switch pulse (SP signal) (FIG. 10) having, for example, a frequency of 5 kHz. A repetition frequency of the SP signal, that is, a period thereof determines a repetition period of laser waves 25a' of a peak shape output from the optical resonator 20'. The RF modulation circuit 35 modulates the RF signal corresponding to periods of an L-level and H-level of the SP signal and generates an RF modulation signal (FIG. 10).

Because if inputting the RF modulation signal (FIG. 10) to the not shown Q-switch arranged inside the optical resonator 20', a resonator loss increases (the Q-value becomes the low value) when the RF modulation signal is ON, a stimulated emission is suppressed inside the optical resonator 20' and thereby a laser oscillation results in stopping a generation thereof. And when the RF modulation signal is OFF, the resonator loss decreases (the Q-value becomes a high value). After a constant delay time, when the RF modulation signal changes from ON to OFF, lapses, the laser waves 25a' of the peak shape are output as a continual pulse laser (for example, see paraphrases 0020 to 0100 and FIGS. 4, 10, and 11 in Japanese Patent Laid-Open Publication 2000-101176 and paraphrases 0002 to 0006 and FIG. 6 in Japanese Patent Laid-Open Publication 2002-359422).

However, in the conventional Q-switch laser device thus described the RF signal and the SP signal are generated from the RF oscillator 31' and the switch pulse generator 32', respectively, and are independent signals. Therefore, as shown in enlarged partial drawings (a), (b), and (c) of FIG. 10, each phase of the RF modulation signal at arising timing thereof to the H-level does not accord with any phase. Thus a waveform at timing when the RF modulation signal changes to OFF (the Q-value changes from a low value to a high one) has an unstable form. Accordingly, because an identity of the waveform at a termination portion of an ON period of the RF modulation signal, occurs a phenomenon that an identity is not kept also in the laser waves 25a' emitted from the optical resonator 20'. Thus deriving from phases of the RF signal and SP signal, which become a basis for generating the RF modulation signal, being not in synchronization, the identity of the laser waves 25a' is not kept, a jitter increases, and thereby peak power and energy result in fluctuating. Using such the pulse laser, for example, in performing marking and a minuscule processing there is a problem that a predetermined shape cannot be maintained.

On the other hand, as in an invention in Japanese Patent Laid-Open Publication 2001-7429, for such the problem is proposed a method for aligning the phase of the RF signal at an arising position of a trigger pulse applied to these Q-switch lasers. But because in this invention a concrete circuit for controlling an OFF phase of the RF signal is not proposed, a pulse laser control by a gate signal is required for a laser output, and a pulse distance of a pulse laser is not fixed, it is thought that a realization thereof is not easy.

Thus in order to solve the problem described above, it is strongly requested to provide a Q-switch laser device with no jitter whose output is stable by mounting a simple circuit for synchronizing the phase of the RF signal with that of the SP signal for modulating the RF signal.

SUMMARY OF THE INVENTION

The present invention is originated to solve the problem: A first aspect of a Q-switch laser device of the invention is the laser device for outputting a pulse laser from an optical resonator, which laser device comprises a Q-switch for changing a high/low value of a Q-value for the optical resonator; a switch pulse generation means for generating a switch pulse, which has a frequency for determining a repetition period of the pulse laser; an RF oscillation means for generating an RF signal, which is a signal of a higher frequency than an frequency of the switch pulse; a pulse synchronization means for inputting the switch pulse and the RF signal and outputting a phase synchronization pulse, where arising timing of the switch pulse is synchronized with a phase of the RF signal; an RF modulation means for inputting the phase synchronization pulse and outputting the RF signal as an RF modulation signal where the RF signal is made ON/OFF, corresponding to a period of any of an L-level and a H-level of an input signal, wherein the Q-switch changes the Q-value of the optical resonator to any of the high value and the low value, based on the RF modulation signal.

In accordance with such the configuration the RF signal is converted to the RF modulation signal modulated corresponding to any of the L-level and the H-level of the phase synchronization pulse (CP (Clock Pulse) signal) by the RF modulation means. If the RF modulation signal is input to the Q-switch, it changes the Q-value of the optical resonator to any of the high value and the low value, corresponding to the RF modulation signal. In addition, when the phase synchronization pulse (CP signal) is the H-level, it is assumed that an oscillation of the RF signal stops, the Q-value of the optical resonator becomes the high value, and thereby the pulse laser outputs.

A phase of the phase synchronization pulse (CP signal) is synchronized with that of the RF signal by the pulse synchronization means. Therefore, at timing when the Q-value changes from the low value to the high one, that is, the timing when the switch pulse arises from the L-level to the H-level, the phase of the RF modulation signal becomes same in any timing. Thus in a laser wave of a peak shape having a same period as a repetition period of the switch pulse, a jitter is alleviated and the laser wave results in being output from the optical resonator.

Here, the Q-value is expressed as $Q=2\pi/G \cdot (L/\lambda)$, where G is a loss; L is a length of a portion where light within an optical resonator reciprocates; and $\lambda$ is a wavelength. Although when making the Q-value the low value, a movement of a photon reciprocating within the optical resonator is impeded, the loss of the optical resonator increases, and a laser oscillation is suppressed, a reversal distribution of an electron augments. If when the reversal distribution of the electron augments and excitation energy becomes a saturation state, the Q-value is drastically changed to the high value, a laser wave of a peak shape whose power is large is output. Here by the RF modulation signal being input to the Q-switch, G (loss) of the optical resonator periodically changes and thereby a change between the low value and the high value of the Q-value is repeated at a constant period (this corresponds to the period of the switch pulse).

Furthermore, a second aspect of a Q-switch laser device of the present invention is, in the Q-switch laser device of the first aspect, configured so that the phase synchronization pulse is input; to have a pulse-width modulation means for newly outputting a width modulation pulse, whose pulse width is made a predetermined period with making a pulse arising timing a base point; and so that the RF modulation means inputs the width modulation pulse instead of the phase synchronization pulse.

In accordance with such the configuration, a period when the Q-value of an optical resonator is made a high value can be arbitrary set by freely adjusting the pulse width $t_w$ of the width modulation pulse. And provided that a multipurpose IC circuit, for example, such as a mono-stable multi-vibrator is used as the pulse-width modulation means, it can be cheaply and simply realized. Furthermore, provided that a time is $\tau$ until a laser wave is output after the Q-value of an optical resonator changes from a low value to a high one, the Q-value of the optical resonator can be instantaneously changed to the low value after an output of a laser wave by setting the pulse width $t_w$ a little bit larger than $\tau$. Thus because after the output of the laser wave a period until excitation energy becomes a saturation state can be shortened, a repetition period when the laser wave is output with heightening a frequency of a switch pulse can be shortened.

Still furthermore, a third aspect of a Q-switch laser device of the present invention is, in the Q-switch laser device of the first aspect, configured so that the phase synchronization pulse is input; to have a reset means for resetting an output of the pulse synchronization means to an L-level at timing of a predetermined period elapse by making timing of the phase synchronization pulse having arisen to an H-level a base point; and so that the RF modulation means inputs a width modulation pulse, where a pulse width of the phase synchronization pulse is adjusted to a predetermined period, instead of the phase synchronization pulse.

In accordance with such the configuration, after changing from the L-level to the H-level, the phase synchronization pulse output from the pulse synchronization means is again returned to the L-level by the reset means after an elapse of a set time (pulse width) $t_w$. Thus the pulse width $t_w$ of the width modulation pulse can be freely adjusted within a range of not exceeding a pulse width of a switch pulse, and same as in the second aspect of the present invention, a period when the Q-value of an optical resonator becomes a high value can be arbitrary set.

Yet furthermore, a fourth aspect of a Q-switch laser device of the present invention is, in any of the first to third aspects of the Q-switch laser device, configured so that the RF modulation signal is input; to have a signal separation circuit means for outputting the RF modulation signal to the Q-switch and also to the pulse synchronization means; and so that the pulse synchronization means outputs the phase synchronization pulse instead of the RF signal, based on the RF modulation signal.

In accordance with such the configuration, timing when the RF modulation signal is made OFF becomes surely in synchronization with a phase of the phase synchronization pulse.

Yet still furthermore, a fifth aspect of a Q-switch laser device of the present invention is, in any of the first to third aspects of the Q-switch laser device, configured to have a frequency divider means for inputting the RF signal and outputting the RF signal to the RF synchronization means and also to the pulse synchronization means.

In accordance with such the configuration a switch pulse is converted to a phase synchronization pulse where arising timing of the switch pulse is in synchronization with a phase of the RF signal, whose frequency is divided by the frequency divider means just after output from the RF oscillation means, and is output from the pulse synchronization means.

In addition, a sixth aspect of a Q-switch laser device of the present invention is, in any of the first to fifth aspects of the Q-switch laser device, configured so that the pulse synchronization means is a D-type flip-flop.

In accordance with such the configuration the pulse synchronization means is configured of the D-type flip-flop commercialized as a multipurpose IC circuit, and thereby the pulse synchronization means can be cheaply and simply realized.

Figure 3:
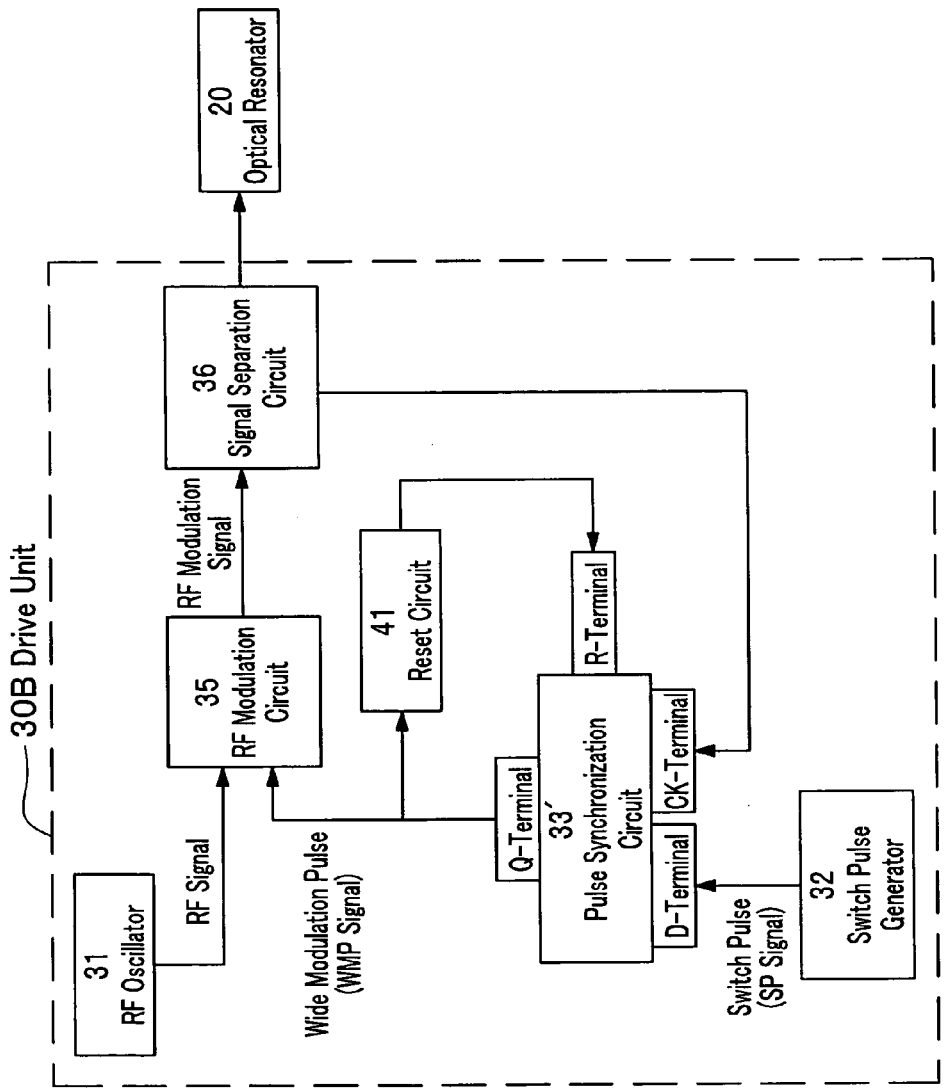
FIG. 3 is a block diagram showing a basic configuration in a second embodiment of a Q-switch laser device related to the present invention.
Figures 1, 4A:
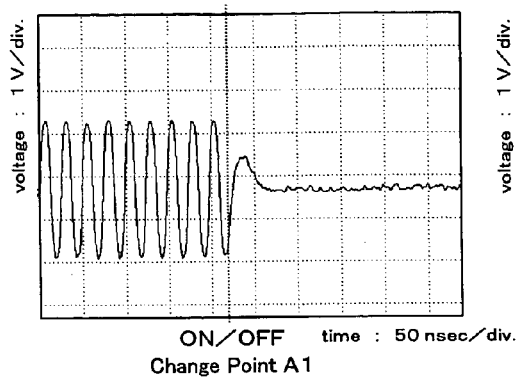
FIG. 1 is a block diagram showing a basic configuration in a first embodiment of a Q-switch laser device related to the present invention.
Figures 1, 4B:
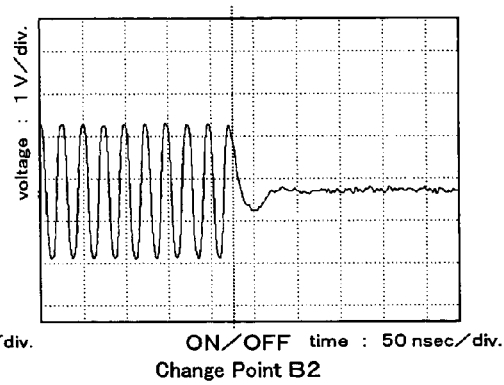
Figures 2, 4A:
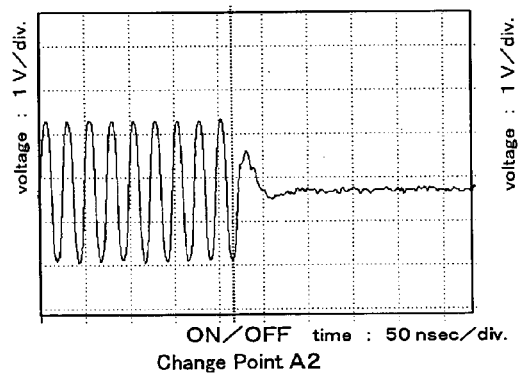
Figures 2, 4B:
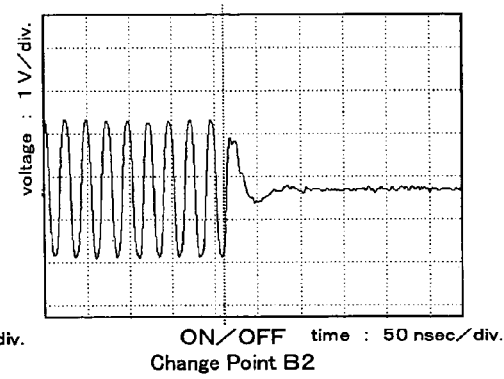
Figures 3, 4A:
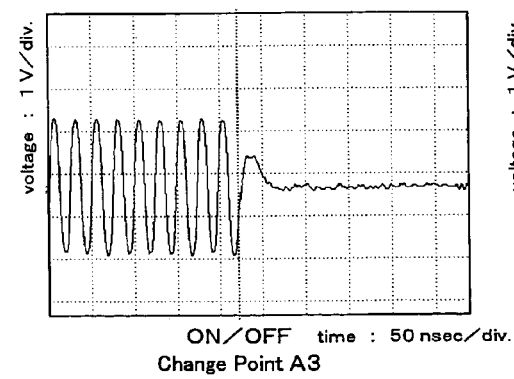
Figures 3, 4B:
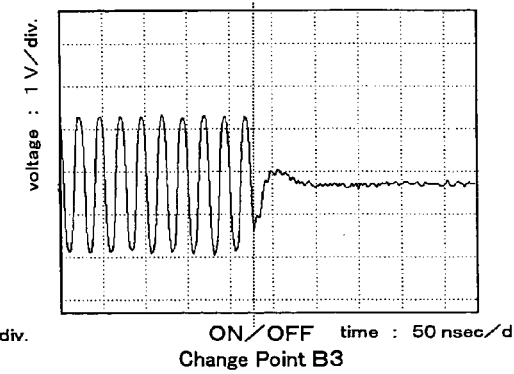

Each of FIGS. 4A-1 to 4A-3 is a graph showing a waveform before/after an On/Off change of an RF modulation signal in the present invention; Each of FIGS. 4B-1 to 4B-3 is a graph showing a waveform before/after an On/Off change of an RF modulation signal in a conventional example.

Figure 5A:
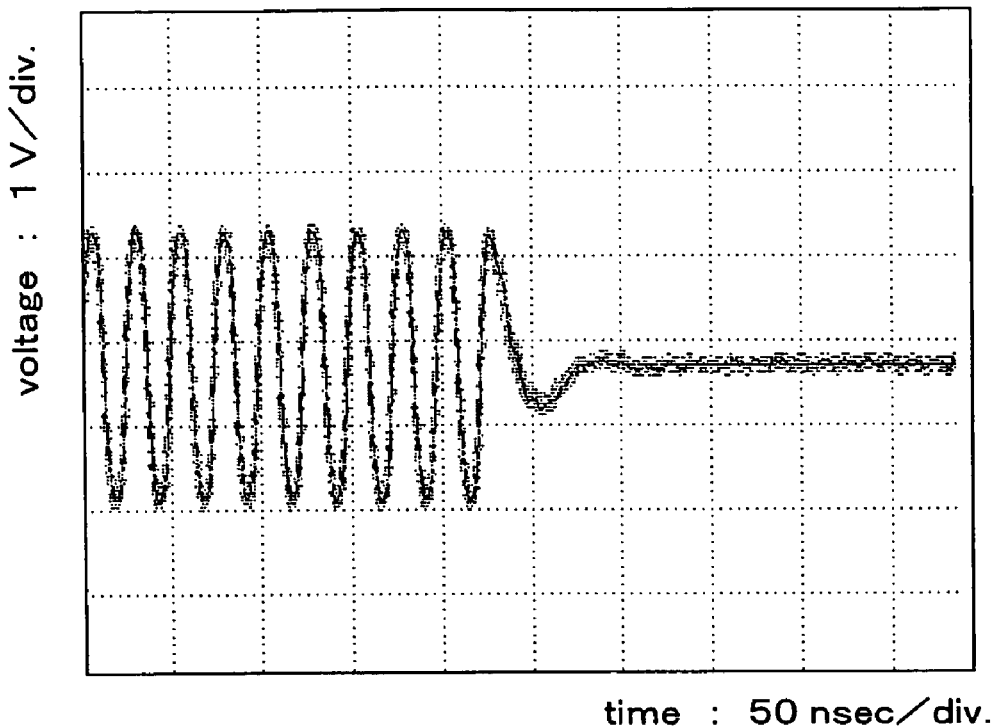
Figure 5B:
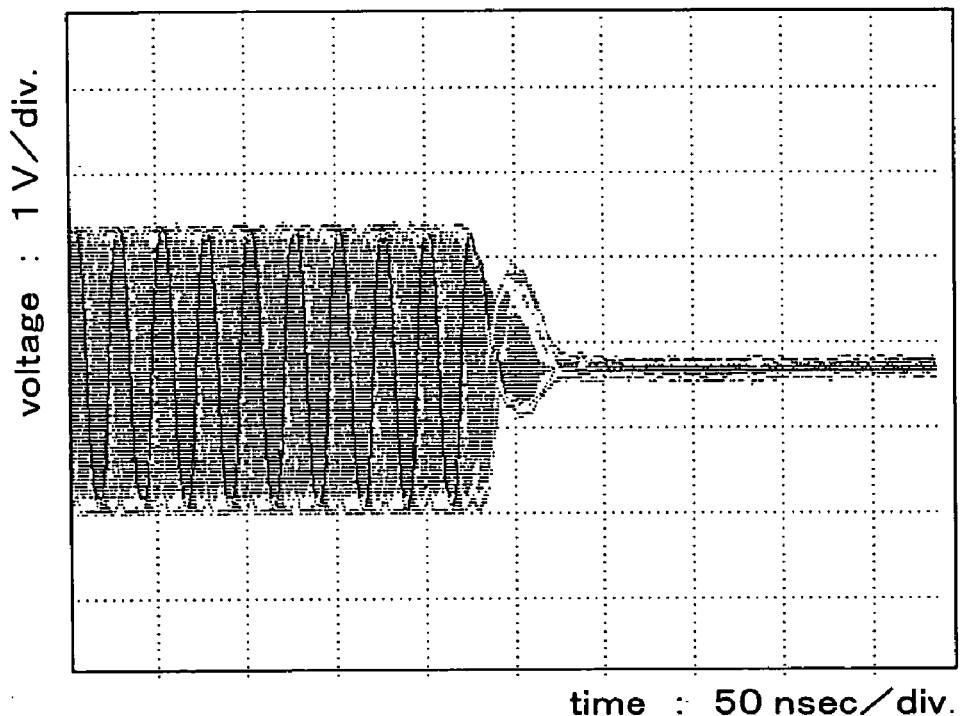

FIG. 5A is a composite waveform graph of a state in the present invention, where a time axis is aligned and a plurality of RF modulation signals are overlapped; FIG. 5B is a composite waveform graph of a state in a conventional example, where a time axis is aligned and a plurality of RF modulation signal are overlapped.

Figure 6A:
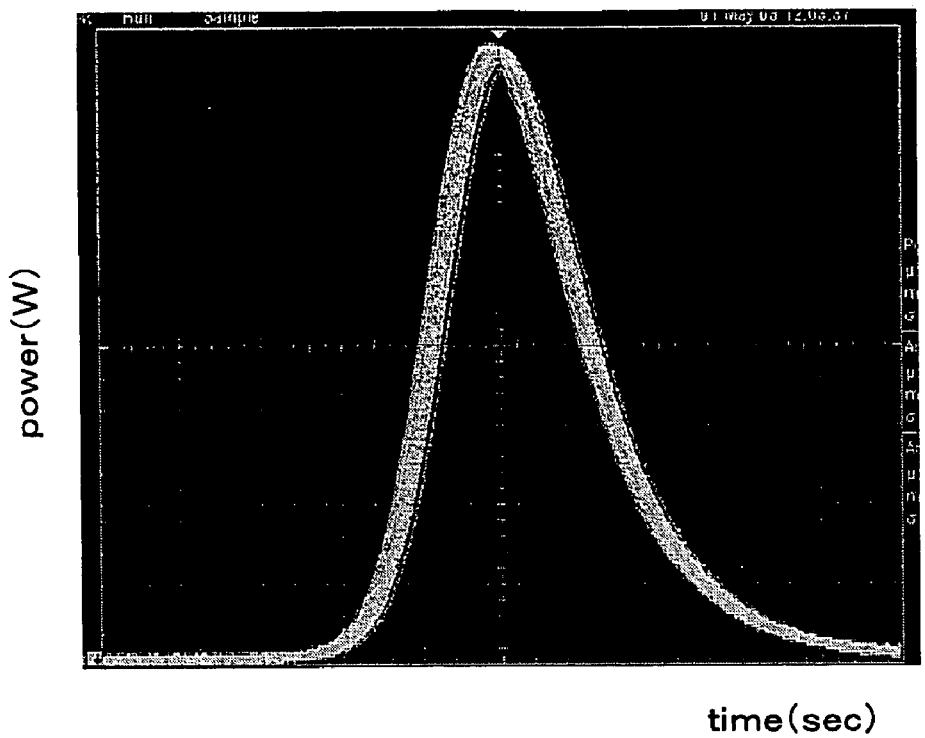
Figure 6B:
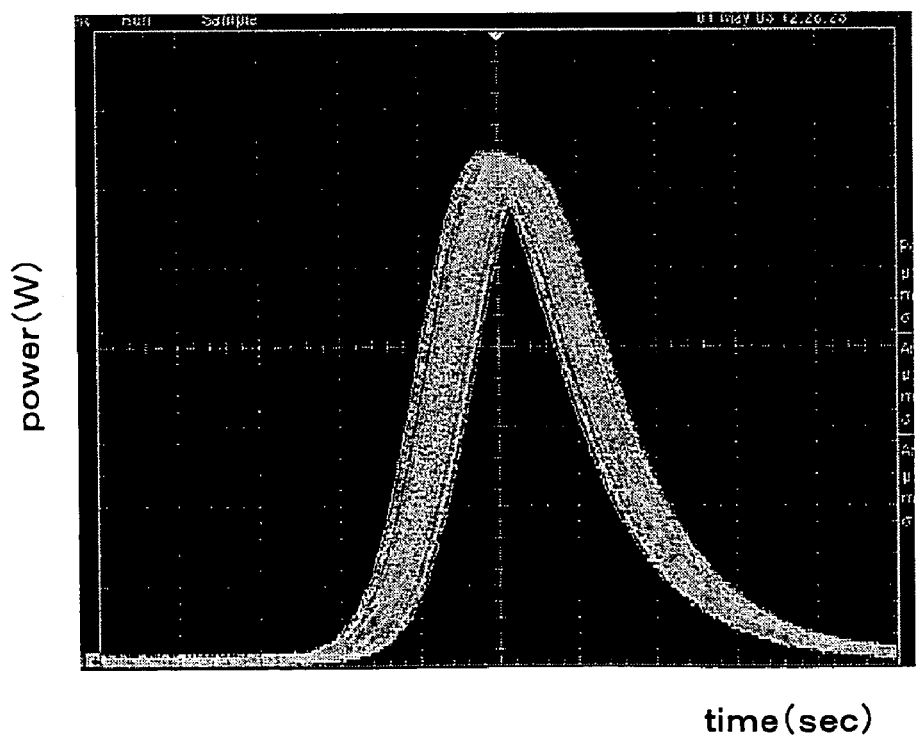

FIG. 6A is a graph in the present invention, where a laser wave of an output pulse laser is overwritten; FIG. 6B is a graph in a conventional example, where a laser wave of an output pulse laser is overwritten.

FIG. 7A is a frequency distribution graph of peak power in a laser wave of an output pulse laser in the present invention; FIG. 7B is a frequency distribution graph of peak power in a laser wave of an output pulse laser in a conventional example.

FIG. 8A is a frequency distribution graph of energy in a laser wave of an output pulse laser in the present invention;

FIG. 8B is a frequency distribution graph of energy in a laser wave of an output pulse laser in a conventional example.

Figure 9:
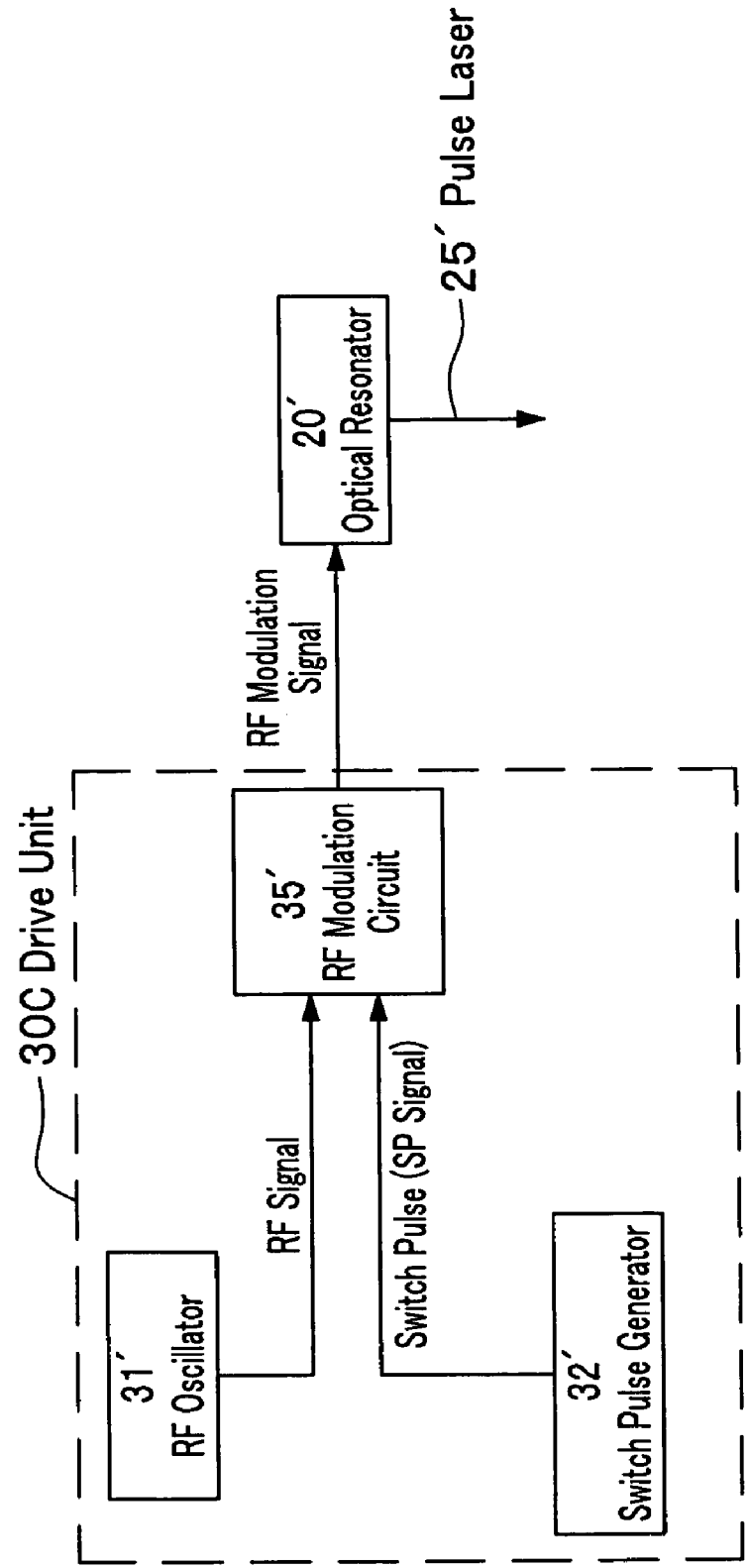
Figure 10:
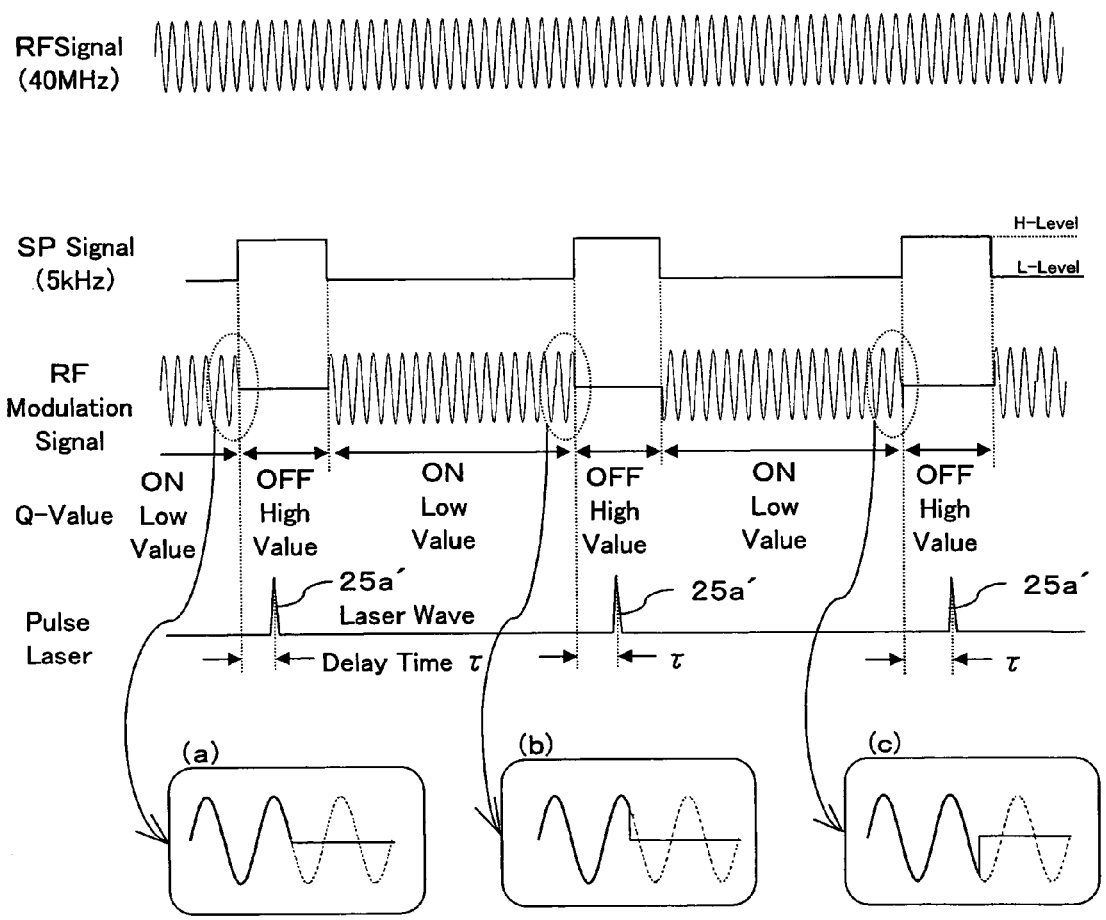

FIG. 9 is a block diagram showing a basic configuration of a drive unit in a conventional Q-switch laser device FIG. 10 is an illustration drawing representing signals, which components configuring a drive unit handle, in a conventional Q-switch laser device.

DESCRIPTION OF THE MOST PREFERRED EMBODIMENTS

Here will be described embodiments of the present invention in detail, referring to the drawings.

First Embodiment

Figure 2:
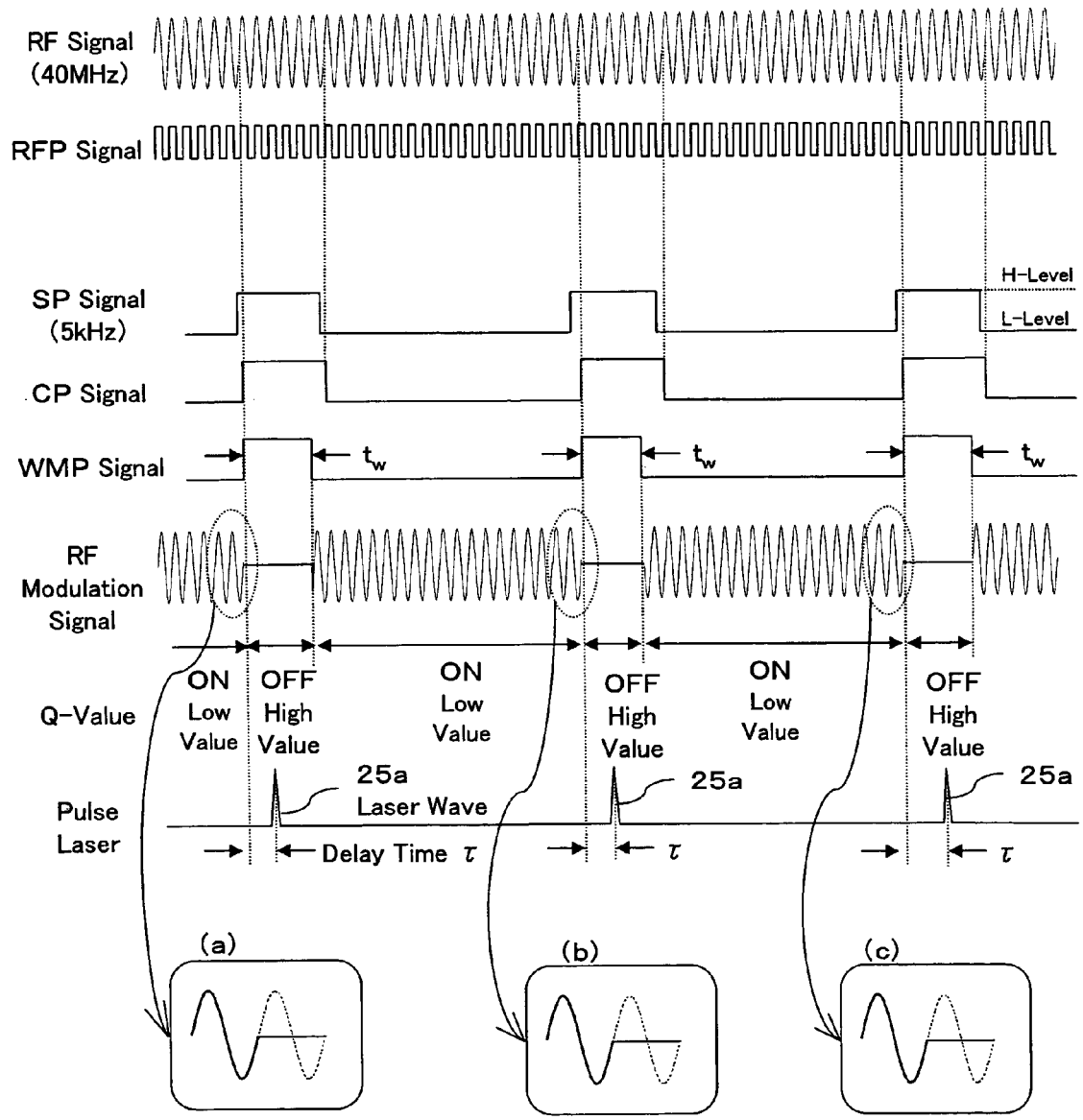
FIG. 2 is an illustration drawing representing signals, which components configuring a drive unit in a Q-switch laser device related to the present invention handle.

A first embodiment of the present invention will be described, referring to FIGS. 1 and 2.

A Q-switch laser device 10 comprises an optical resonator 20 and a drive unit 30A. The optical resonator 20 comprises a solid laser medium 21, an output mirror 22, a total reflection mirror 23, and a Q-switch 24, and outputs a pulse laser 25. In addition, although not shown, in some case a non-linear optical crystal for converting a laser wavelength is arranged inside or outside the optical resonator 20.

The solid laser medium 21 is a cylindrical laser rod comprising Nd, YAG; Nd, $YVO_4$; and the like as a laser medium. When an excitation light source (not shown) arranged in vicinity of a side periphery of the laser rod is lit, the solid laser medium 21 is excited, excitation energy augments, and thereby emits fluorescence.

The output mirror 22 uses any of quartz and hard glass as a substrate, whose surface accuracy and surface roughness are made one tenth of an applied wavelength and one hundredth of the surface accuracy, respectively; and a reflection film is formed on a surface of the substrate in multi-layers. Here provided that a reflectance of the output mirror 22 is R, power of reflection light and permeation light result in being made R-fold and (1-R)-fold, respectively. That is, the more a layer number of the reflection film increases, the more the reflectance R nears 1, and thereby the power of the permeation light results in being reduced.

The total reflection mirror 23 is something where the reflection film is made more multilayer than the output mirror 22 and the reflectance R is made 1. Therefore, fluorescence generated from the solid laser medium 21 and permeated through the Q-switch 24 results in achieving a condition of a total reflection, where the fluorescence is nearly 100% reflected by the total reflection mirror 23.

Although the Q-switch 24 changes a Q-value of the optical resonator 20 to any of a low value and a high one, and various types are thought of, here it is assumed to be configured of an acousto-optical element utilizing Bragg diffraction by ultrasound. The Q-switch 24 has an incident widow 24a made of quartz glass, and when the ultrasound generated by a piezoelectric not shown is propagated to the incident widow 24a, a periodic refractive index distribution occurs. Although in a state where there is no refractive index distribution fluorescence emitted by the solid laser medium 21 reaches the total reflection mirror 23 with permeating the incident widow 24a, in a state where there is a refractive index distribution the fluorescence is diffracted and cannot permeate the incident widow 24a. The piezoelectric not shown generates ultrasound by piezo effect when a sine wave signal having a predetermined frequency is input to the Q-switch 24. Accordingly, by inputting the sine wave signal (RF signal described later) to the Q-switch 24 after modulating it, the Q-value of the optical resonator 20 can be changed to any of the low value and the high one, corresponding to a modulation signal.

In the optical resonator 20 thus configured, first, because when an RF modulation signal is input to the Q-switch 24, fluorescence emitted by the solid laser medium 21 is diffracted at the incident window 24a, the Q-value of the optical resonator 20 lowers (becomes the low value) and a laser oscillation stops. During this time, because the excitation of the solid laser medium 21 continues, a reversal distribution becomes high and thereby excitation energy accumulated inside augments. Next, when an input of the RF modulation signal to the Q-switch 24 becomes OFF, the Q-value of the optical resonator 20 recovers (becomes the high value), the laser oscillation starts. That is, when the fluorescence emitted by the solid laser medium 21 reciprocates within the solid laser medium 21 with being reflected between a pair of mirrors consisting of the output mirror 22 and the total reflection mirror 23, a transition from a high energy level to a low energy one occurs in a short time by stimulated emission. Therefore, because accumulated excitation energy is emitted in the short time from the solid laser medium 21, laser waves 25a (FIG. 2), whose peak shape is extremely high, result in being output from the output mirror 22 in the optical resonator 20.

The drive unit 30A comprises an RF oscillator (RF oscillation means) 31, a switch pulse generator (switch pulse generation means) 32, a pulse synchronization circuit (pulse synchronization means) 33, a pulse-width modulation circuit (pulse-width modulation means) 34, an RF modulation circuit (RF modulation means) 35, a signal separation circuit (signal separation means) 36, and a pulse shaping circuit 38; is coupled to the optical resonator 20 via a signal cable 37; and performs drive-control of the Q-switch 24. In addition, as described later, it is made allowable to appropriately provide a frequency divider circuit (frequency divider means) 39 between the RF oscillator (RF oscillation means) 31 and the RF modulation circuit (RF modulation means) 35.

The RF oscillator 31 generates the RF signal (see FIG. 2), which makes the Q-value of the optical resonator 20 the low value when the Q-value is input in the Q-switch 24, and the RF signal is assumed to have a frequency of 40 MHz. In addition, as in FIG. 3 the frequency divider circuit (frequency divider means) 39 is ignored and the RF signal is illustrated in a state where it is directly supplied to the RF modulation circuit 35.

The switch pulse generator 32 (see FIG. 1) specifies a repetition period of the pulse laser 25 emitted by the optical resonator 20 and generates a switch pulse (SP signal) (see FIG. 2) whose frequency is lower than that of the RF signal. Here, the SP signal is assumed to have a frequency of 5 kHz.

The pulse synchronization circuit 33 (see FIG. 1) has a D-terminal and CK-terminal of an input terminal and a Q-terminal of an out put terminal. If after a signal changed from an L-level to an H-level is input to the D-terminal, a signal input to the CK terminal changes from the L-level to the H-level, an input value (H-level) in the D-terminal is made an output value from the Q-terminal. And in the output value, even if the input value input to the CK-terminal changes, an output level of the Q-terminal does not change while an input level of the D-terminal is maintained. And after a signal level input to the D-terminal changes from the L-level to the H-level, the output level of the Q-terminal becomes L at timing when the signal input to the CK-terminal changes from the L-level to the H-level. Thus the pulse synchronization circuit 33 is configured of a D (Delay)-type flip-flop circuit and thereby can cheaply form a circuit.

In the pulse synchronization circuit 33 (see FIG. 1) the SP signal is input to the D-terminal, a RFP signal described later is input to the CK-terminal, and a phase synchronization pulse (CP signal) is output from the Q-terminal. First, even if an input of the SP signal (see FIG. 2) changes from the L-level to the H-level, the CP signal does not immediately changes from the L-level to the H-level. That is, the CP signal changes from the L-level to the H-level in synchronization with timing when the RFP signal input to the CK-terminal changes from the L-level to the H-level. And while the SP signal maintains the H-level, the CP signal also maintains the H-level. Next, even if the SP signal changes from the H-level to the L-level, the CP signal does not immediately changes from the H-level to the L-level and then the CP signal changes to the L-level in synchronization with the RFP signal changing from the L-level to the H-level.

As thus described, a phase of an arising portion (L→H) and lowering portion (H→L) of a pulse of the CP signal is aligned to that of an arising portion (L→H) of the RFP signal by an action of the pulse synchronization circuit 33 and results in being output from the Q-terminal. Thus the arising portion of the CP signal is synchronized with the phase of the RFP signal, resultingly, timing when the Q-switch 24 changes the Q-value from the low value to the high one is synchronized with the phase of the RFP signal, and is brought out an effect that a jitter of output laser waves 25a (see FIG. 2) is alleviated.

In the pulse synchronization circuit 34 (see FIG. 1) the CP signal is input, the pulse synchronization circuit 34 adjusts a lowering portion of a pulse in the CP signal (see FIG. 2), and outputs a width modulation pulse (WMP signal) modulated to the predetermined pulse width $t_w$. Here, the pulse synchronization circuit 34 is, for example, a mono-stable multi-vibrator. By the pulse synchronization circuit 34 an OFF period that makes the Q-value the high value can be arbitrary set regardless of a pulse width of the SP signal. Thus, if when a delay time τ until the laser waves 25a of a peak shape after the RF modulation signal changes from ON to OFF turns out, the OFF period adjusts the pulse width $t_w$ so as to become a little bit larger value than the delay time τ and changes an output frequency of the SP signal so as to make an ON period a necessary and sufficient period when excitation energy becomes a saturation state, then a periodic distance when the laser waves 25a are output can be narrowed. Thus the pulse laser 25 output from the optical resonator 20 can be made high energy.

In the RF modulation circuit 35 (see FIG. 1) the WMP signal and the RF signal are input and the RF modulation circuit 35 outputs the RF modulation signal (see FIG. 2), corresponding to any of the H-level and L-level of the WMP signal. Being input to the Q-switch, the RF modulation signal makes the Q-value of the optical resonator 20 the high value corresponding to the OFF period of the RF modulation signal and the low value corresponding to the ON period. In addition, at change timing from the ON period to OFF period of the RF modulation signal an arising portion of the WMP signal is in synchronization with a phase of the RF signal, and therefore, a phase of the RF modulation signal is aligned in any case (see partial enlarged drawings (a) to (c) in FIG. 2).

The signal separation circuit 36 (see FIG. 1) is provided between the RF modulation circuit 35 and the Q-switch 24 and separates the RF modulation circuit into a signal output to the Q-switch 24 and a signal for performing feedback to the pulse synchronization circuit 33.

The signal cable 37 couples an output terminal of the signal separation circuit 36 and an input end of the Q-switch 24 and has a resistance value of 50 Ω. Thus the signal cable 37 conforms the input/output terminals 50 Ω each other and has a function of preventing a signal reflection of a high frequency. In addition, by making an attenuation ratio of an input/output sufficiently large, the signal cable 37 can suppress a loss in a signal flow less and also an influence of a noise lower, and thereby a stable laser output can be obtained.

The pulse shaping circuit 38 is provided between the signal separation circuit 36 and the pulse synchronization circuit 33 and has a function of shaping the RF modulation signal, which is separated from the signal separation circuit 36, like a pulse and outputting it as the RFP signal (see FIG. 2) of a continual pulse train. The output RFP signal is input to the CK terminal of the pulse synchronization circuit 33 and has a function of synchronizing the phase of the SP signal with that of the RF signal as described above.

Next, the drive unit 30A will be described, referring to FIGS. 1 and 2. A switch pulse (SP signal) of 5 kHz is generated from the switch pulse generator 32 and input to the D-terminal of the pulse synchronization circuit 33. Is input the RFP signal of a pulse train shaped like a pulse in a waveform thereof, based on the RF modulation signal described later.

According to an action of the pulse synchronization circuit 33, the CP signal changes from the L-level to the H-level in synchronization with timing when the RFP signal input to the CK-terminal changes from the L-level to the H-level, after the input of the SP signal changes from the L-level to the H-level. And while the SP signal maintains the H-level, the CP signal also maintains the H-level. Next, the CP signal changes to the L-level in synchronization with the RFP signal changing from the L-level to the H-level. Thus the phase of pulse arising/lowering portions of the CP signal is aligned to the phase of the arising portion of the RFP signal, and the CP signal is output from the Q-terminal. The CP signal is input to the pulse-width modulation circuit 34 and here a pulse width is output as a width modulation pulse (WMP signal) whose pulse width is the predetermined time $t_w$. The RF signal output from the RF oscillator 31 is modulated in the RF modulation circuit 35, corresponding to the L/H-levels of the width modulation pulse (WMP signal), and output as the RF modulation signal.

The RF modulation signal is input to the signal separation circuit 36 and separated: one signal is output to the pulse shaping circuit 38; the other is output to the Q-switch 24 via the signal cable 37. In a state where the RF modulation signal is input to the Q-switch 24, a loss in the optical resonator 20 increases (Q-value is the low value), a light amplification is suppressed, and thereby a laser oscillation results in not occurring; whereas, excitation energy increases within the solid laser medium 21. On the other hand, in a state where the RF modulation signal is not input to the Q-switch 24, a loss in the optical resonator 20 decreases (Q-value is the high value), the laser waves 25a of a peak shape are output with a little bit time delay (delay time τ). Such the operation being repeated, the laser waves 25a with the peak shape are output from the optical resonator 20.

The RF modulation signal separated from the signal separation circuit 36 is input to the pulse shaping circuit 38 and the RFP signal of a pulse train is output. And the RFP signal is input to the CK-terminal of the pulse synchronization circuit 33.

Because in accordance with the present invention thus described, the phase of the RF modulation signal at timing when the Q-value changes from the low value to the high one by the Q-switch 24 always becomes same at any timing, the output of the laser waves 25a with a stable peak shape can result in being output. Thus, when applying the Q-switch laser device 10 to marking and a machine tool for a minuscule processing, a precise patterning formation, which is extremely sharp and intended by a designer, and a processing for work can be made.

Meanwhile, the embodiment is one example for describing the present invention, it is not limited to the embodiment described above, and various variations are available within the spirit and scope of the present invention. In the above description it is exemplified in FIG. 1 that the signal, which is input to the CK-terminal of the pulse synchronization circuit 33, is something (route A) of the RF modulation signal separated by the signal separation circuit 36 via the pulse shaping circuit 38. On the other hand, for example, a same effect can also be brought out in a case where the RF oscillator 31 introduces the frequency divider circuit (frequency divider means) 39 (see FIG. 1) for separating the output RF signal, and appropriately inputs a frequency-divided RF signal to the CK-terminal of the pulse synchronization circuit 33 directly (route C) or through (route B) the pulse shaping circuit 38.

Second Embodiment

Next, a second embodiment of the present invention will be described, referring to FIG. 3. Meanwhile, in FIG. 3 a portion same as in or equivalent to FIG. 1 will be omitted, appending a same symbol.

A feature of the embodiment, that is, a difference between FIG. 3 and FIG. 1 in circuit operation exists in generating the width modulation pulse (WMP signal) by eliminating the pulse-width modulation circuit 34 (see FIG. 1) and introducing a reset circuit 41 (see FIG. 3).

A pulse synchronization circuit 33' (see FIG. 3) newly has a reset terminal (R-terminal), compared to the pulse synchronization circuit 33 (see FIG. 1). Simultaneously when a signal of the L-level is input to the R-terminal, an output signal of the Q-terminal is made the L-level, next a signal of the H-level is input to the D-terminal, and then, while a signal of the H-level is input to the CK-terminal, the pulse synchronization circuit 33' has an effect of keeping the output signal of the Q-terminal the L-level. Meanwhile, although in FIG. 3 the RF modulation signal separated by the signal separation circuit 36 is directly input to the CK-terminal, it may be input after being shaped to a pulse train via the pulse shaping circuit 38 (see FIG. 1).

In the reset circuit 41 an output from the Q-terminal is input, the input signal changes from the L-level to the H-level, and after a lapse of the predetermined time (pulse width) $t_w$, the reset circuit 41 sends a signal of the L-level to the R-terminal of the pulse synchronization circuit 33'. Thus the reset circuit 41 has an action of forcibly making the output from the Q-terminal of the pulse synchronization circuit 33' the L-level. By actions of the pulse synchronization circuit 33' and the reset circuit 41, the reset circuit 41 generates a width modulation pulse (WMP signal) (see FIG. 2) same as in the first embodiment.

Thus a switch pulse (SP signal) is adjusted to the pulse width $t_w$ by the action of the reset circuit 41, is converted as the width pulse modulation pulse (WMP signal), and an arising phase of the switch pulse is synchronized with a phase of the RF modulation signal. After then, in the RF modulation circuit 35 the RF modulation signal results in being formed of the RF signal and the width modulation pulse (WMP signal).

EXAMPLE 1

Next, will be described an example for verifying an effect of the present invention. Using the Q-switch laser device 10 of the first embodiment, waveforms at timing, when an ON period of the RF modulation signal terminates, are compared between a case (the present invention), where a phase synchronization adjustment of the RF signal (or RF modulation signal) and the CP signal is performed, and another case (conventional example), where the phase synchronization adjustment is not performed. Here, the RF signal becoming a basis of the RF modulation signal is 40 MHz and the SP signal is 5 kHz.

FIGS. 4A-1 to 4A-3 are graphs showing waveforms before/after ON/OFF changes in RF modulation signals when a phase synchronization adjustment is performed (the present invention). As shown, any waveform at an end just after ON/OFF change points A1 to A3 of the RF modulation signals turns out to be a same shape. From this result by synchronizing an arising portion of the CP signal with a phase of the RF signal, it is understandable that a repeatability of a waveform at timing, when the RF modulation signal optically closes/opens the Q-switch 24, becomes stable. FIG. 5A is a composite graph in a state where a plurality of RF signals are overlapped with aligning a time axis when a phase synchronization adjustment is performed (the present invention). In accordance with FIG. 5A it is more clearly understandable in the present invention that there is no deviation of phases at an OFF timing of the RF modulation signals.

FIGS. 4B-1 to 4B-3 are graphs showing waveforms before/after ON/OFF changes in RF modulation signals when the phase synchronization adjustment is not performed (conventional example). As shown, it turns out that there is a deviation of about one period in a waveform at an end just after each of ON/OFF change points B1 to B3 of RF modulation signals. From this result, forming an RF modulation signal from a respective independent RF signal and SP signal, it is understandable that a waveform at timing, when the RF modulation signal optically closes/opens the Q-switch 24, becomes unstable. FIG. 5B is a composite graph in a state where a plurality of RF signals are overlapped with aligning a time axis when a phase synchronization adjustment is not performed (conventional example). In accordance with FIG. 5B it is more clearly understandable in a conventional technology that there are deviations of phases at an OFF timing of the RF modulation signals.

EXAMPLE 2

Next, are compared output results of respective output laser waves 25a (see FIG. 2) of RF modulation signals formed in a case (the present invention), where the phase synchronization adjustment is performed, and another case, where the phase synchronization adjustment is not performed (conventional example).

FIG. 6A is a graph where the Q-switch 24 is operated by the RF modulation signals (the present invention where the phase synchronization adjustment is performed) shown in FIGS. 4A-1 to 4A-3 and a plurality of laser waves continuously output are overwritten, respectively. FIG. 6B is a graph where a Q-switch 24' (not shown) is operated by the RF modulation signals (conventional example where the phase synchronization adjustment is not performed) shown in FIGS. 4B-1 to 4B-3 and a plurality of laser waves continuously output are overwritten, respectively.

As obvious by comparing FIG. 6A with FIG. 6B, it is clear that an laser output becomes stable and the jitter of laser waves decrease by performing the phase synchronization adjustment and making it stable the repeatability of a waveform at an end in a termination portion of an ON period of the RF modulation signal. In other words, by synchronizing timing, when the RF modulation signal is made ON/OFF, with the phase of the RF signal, it turns out that an output of the pulse laser 25 becomes stable.

Each of FIGS. 7A and 7B is a graph showing relative values of peak power (maximum value) of laser waves in FIGS. 6A and 6B, respectively. A horizontal axis indicates a ratio of the peak power of other laser waves for that of laser waves that becomes a standard; a vertical axis indicates a frequency in each ratio. An rms value, which means a deviation degree of a frequency distribution, shows ±0.5% (rms) in FIG. 7A. On the other hand, in FIG. 7B is shown ±1.2% (rms), and it shows a result that a deviation of the peak power of the laser waves is improved by implementing the present invention.

Each of FIGS. 8A and 8B is a graph showing relative values of energy (equivalent to an area of a waveform) of laser waves in FIGS. 6A and 6B, respectively. A horizontal axis indicates a ratio of the energy of other laser waves for that of laser waves that becomes a standard; a vertical axis indicates a frequency in each ratio. An rms value shows ±0.4% (rms) in FIG. 8A; whereas, ±1.2% (rms) in FIG. 8B. That is, it shows a result that a deviation of the energy of the laser waves is improved by implementing the present invention.

What is claimed is:

1. A Q-switch laser device for outputting a pulse laser from an optical resonator, the device comprising:
    a Q-switch for changing any of a high value and low value of a Q-value for said optical resonator;
    a switch pulse generation means for generating a switch pulse, which has a frequency for determining a repetition period of said pulse laser;
    an RF oscillation means for generating an RF signal, which is a signal of a higher frequency than a frequency of said switch pulse;
    a pulse synchronization means for inputting said switch pulse and said RF signal and outputting a phase synchronization pulse, where arising timing of said switch pulse is synchronized with a phase of said RF signal; and
    an RF modulation means for inputting said phase synchronization pulse and outputting said RF signal as an RF modulation signal of said RF signal that is made ON/OFF, corresponding to a period of any of an L-level and H-level of an input pulse,
    wherein said Q-switch changes the Q-value of said optical resonator to any of the high value and the low value, based on said RF modulation signal.

2. A Q-switch laser device according to claim 1, which comprises a pulse-width modulation means for inputting said phase synchronization pulse and outputting a width modulation pulse where a pulse width is made a predetermined period with making arising timing of a pulse a base point, wherein said RF modulation means inputs the width modulation pulse instead of said phase synchronization pulse.

3. A Q-switch laser device according to claim 1, which comprises a reset means for inputting said phase synchronization pulse, making arising timing of a pulse, when the phase synchronization pulse arises to an H-level, a base point, and resetting an output of said pulse synchronization means to an L-level at timing of an elapse of a predetermined period, wherein said RF modulation means inputs a width modulation pulse instead of said phase synchronization pulse, and wherein the width modulation pulse is comprised of a pulse width of said phase synchronization pulse being adjusted to said predetermined period by said reset means.

4. A Q-switch laser device according to claim 1, which comprises a signal separation means for inputting said RF modulation signal, outputting the RF modulation signal to said Q-switch, and outputting said RF modulation signal also to said pulse synchronization means, wherein said pulse synchronization means outputs said phase synchronization pulse instead of said RF signal, based on said RF modulation signal.

5. A Q-switch laser device according to claim 2, which comprises a signal separation means for inputting said RF modulation signal, outputting the RF modulation signal to said Q-switch, and outputting said RF modulation signal also to said pulse synchronization means, wherein said pulse synchronization means outputs said phase synchronization pulse instead of said RF signal, based on said RF modulation signal.

6. A Q-switch laser device according to claim 3, which comprises a signal separation means for inputting said RF modulation signal, outputting the RF modulation signal to said Q-switch, and outputting said RF modulation signal also to said pulse synchronization means, wherein said pulse synchronization means outputs said phase synchronization pulse instead of said RF signal, based on said RF modulation signal.

7. A Q-switch laser device according to claim 1, which comprises a frequency divider means for inputting said RF signal, outputting the RF signal to said RF modulation means, and outputting said RF signal also to said pulse synchronization means.

8. A Q-switch laser device according to claim 2, which comprises a frequency divider means for inputting said RF signal, outputting the RF signal to said RF modulation means, and outputting said RF signal also to said pulse synchronization means.

9. A Q-switch laser device according to claim 3, which comprises a frequency divider means for inputting said RF signal, outputting the RF signal to said RF modulation means, and outputting said RF signal also to said pulse synchronization means.

10. A Q-switch laser device according to claim 4, which comprises a frequency divider means for inputting said RF signal, outputting the RF signal to said RF modulation means, and outputting said RF signal also to said pulse synchronization means.

11. A Q-switch laser device according to claim 5, which comprises a frequency divider means for inputting said RF signal, outputting the RF signal to said RF modulation means, and outputting said RF signal also to said pulse synchronization means.

12. A Q-switch laser device according to claim 6, which comprises a frequency divider means for inputting said RF signal, outputting the RF signal to said RF modulation means, and outputting said RF signal also to said pulse synchronization means.

13. A Q-switch laser device according to claim 1, wherein said pulse synchronization means is a D-type flip-flop.

14. A Q-switch laser device according to claim 2, wherein said pulse synchronization means is a D-type flip-flop.

15. A Q-switch laser device according to claim 3, wherein said pulse synchronization means is a D-type flip-flop.

16. A Q-switch laser device according to claim 4, wherein said pulse synchronization means is a D-type flip-flop.

17. A Q-switch laser device according to claim 5, wherein said pulse synchronization means is a D-type flip-flop.

18. A Q-switch laser device according to claim 6, wherein said pulse synchronization means is a D-type flip-flop.

19. A Q-switch laser device according to claim 7, wherein said pulse synchronization means is a D-type flip-flop.

20. A Q-switch laser device according to claim 8, wherein said pulse synchronization means is a D-type flip-flop.

21. A Q-switch laser device according to claim 9, wherein said pulse synchronization means is a D-type flip-flop.

22. A Q-switch laser device according to claim 10, wherein said pulse synchronization means is a D-type flip-flop.

23. A Q-switch laser device according to claim 11, wherein said pulse synchronization means is a D-type flip-flop.

24. A Q-switch laser device according to claim 12, wherein said pulse synchronization means is a D-type flip-flop.

* * * * *